July 18, 1939.  W. H. WEST  2,166,384

ALARM VALVE FOR PNEUMATIC TIRES

Filed July 1, 1937

INVENTOR,
William H. West,
BY Hovey F. Hamilton
ATTORNEYS.

Patented July 18, 1939

2,166,384

UNITED STATES PATENT OFFICE 2,166,384

ALARM VALVE FOR PNEUMATIC TIRES

William H. West, Kansas City, Mo.

Application July 1, 1937, Serial No. 151,414

3 Claims. (Cl. 137—69.5)

This invention relates to alarm valves suitable for pneumatic tires to indicate high pressure, low pressure and excessive heat within the inner tube.

The principal hazards encountered in the use of pneumatic tires are caused by too high or too low pressure or excessive heat within the inner tube. Too high pressure may be caused by rising atmospheric temperature or by increase in temperature due to friction during driving and this high temperature causes an expansion of the air within the inner tube, which may result in a blow-out. Too high temperature is usually caused by fast driving or by driving in hot regions, and in many instances causes a disintegration of the rubber of the inner tube.

Low pressure is usually caused by leakage of air from the inner tube. Low pressure in the inner tube is dangerous since it is not sufficient to support the varying load to which the tire is subjected during the driving operation, thus allowing the walls of the inner tube and casing to become bruised and cut.

The principal object of the present invention is to provide a tire alarm valve which will signal the operator when the air pressure in the tire becomes too high, too low, or when the temperature in the tire becomes excessive.

Other objects are simplicity of construction, accuracy of operation, and adaptability to various types of tires.

With these, as well as other, objects, which will appear during the course of the specification, in mind, reference will now be had to the drawing, wherein.

Figure 2:
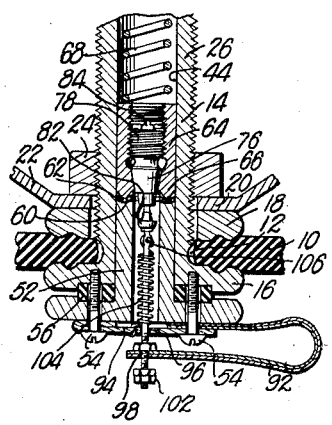
Fig. 2 is a fragmentary, sectional view showing the parts in the position to signal in case of too low pressure.

Throughout the several views, like reference characters refer to similar parts, and the numeral 10 designates a portion of an inner tube, having an opening 12 formed therethrough. A valve tube 14 is inserted through opening 12, with the end flange 16 thereof resting against the inner wall of tire tube 10 adjacent the opening.

A washer 18 is fitted over valve tube 14 and against the outer wall of tire tube 10. A further washer 20, having guard wings 22, is also threaded on tube 14 to rest against washer 18. This assemblage is then tightened against flange 16 by means of a nut 24, which engages the external threads 26 of the valve tube. The upper end of valve tube 14 is reduced at 28 and provided with threads 30. Adjustably mounted on tube 14 at 28 is a nut 32, which carries a rubber gasket 34. This rubber gasket is adapted to snugly fit the interior wall 36 of a whistle cap 38 mounted axially on valve tube 14 and adapted to move longitudinally thereon as the air pressure in chamber 40 is increased sufficiently to overcome the friction between the rubber gasket 34 and the inner wall 36.

The whistle cap 38 is provided with an aperture 42, which is normally positioned intermediate gasket 34 and the inner tube 10. This aperture, however, will be moved to a position above gasket 34, as shown by dotted lines in Fig. 1, when sufficient air is discharged through valve tube 14 and into chamber 40. When so positioned, air passing through the aperture 42 will produce an audible signal.

An opening 44 extends axially through valve tube 14. This opening 44 has an enlarged portion 48 extending from the inner end of the tube 14 to a point spaced apart from the outer end thereof, thereby producing a shoulder 50. A flanged sleeve 52 is adapted to snugly fit into the enlarged open portion 48 of the tube and to be tightly secured in position by means of screws 54. To prevent leakage of air between the outer wall of sleeve 52 and the inner wall of opening 44, a gasket 56 is positioned between the flange 58 of sleeve 52 and flange 16 of the tube. The inner end of sleeve 52 is recessed at 60 and provided with an annular gasket 62.

Slidably mounted in opening 44 intermediate shoulder 50 and sleeve 52, is a valve cage 64. This valve cage is provided at its inner end with an annular lip 66, which is normally forced against gasket 62 by the action of compression spring 68 interposed between shoulder 50 and the outer end of cage 64.

Figure 5:
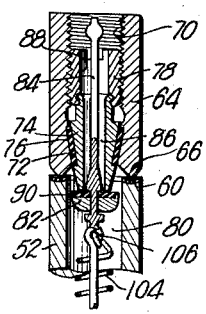
Fig. 5 is an enlarged, fragmentary, sectional view of the valve assembly.

Referring now to Fig. 5, it will be observed that cage 64 is provided with a longitudinal bore 70, terminating in a frusto-conical section 72 adjacent its inner end. A valve seat 74, having a rubber gasket 76, is adapted to be snugly fitted into the frusto-conical portion of bore 70 and is secured in position by an internal nut 78, mounted in said cage.

The inner end of valve seat 74 extends beyond the end of cage 64 and into the opening 80 formed through sleeve 52. A longitudinally movable valve 82, mounted on stem 84 which extends through recess 86 in valve seat 74 and the axial opening 88 in nut 78, is adapted to co-operate with valve seat 74 to preclude the passage of air from the inner tube to chamber 40. To facilitate proper seating of valve 82, a resilient facing 90 is provided. The valve stem 84 also extends inwardly through opening 80 and beyond flange 58 to engage the free end of the bi-metallic thermostat 92.

This thermostat 92 is substantially U-shaped and is secured to the valve tube by means of one of the bolts 54 which engages a hole formed through one end of the thermostat. A bar 94, also secured by means of bolts 54, extends across opening 80 and is provided with a centrally disposed opening 96, through which stem 84 is projected; also, said stem extends through opening 98 formed through the free end of the thermostat 92. The outer end of stem 84 is threaded and provided with an adjustable nut 100, positioned intermediate bar 94 and the free end of the thermostat. Furthermore, nuts 102 are provided at the extremity of the stem 84 outside the thermostat 92. The functioning of these nuts, which serve as abutments, will be hereinafter set forth.

A contraction spring 104, of predetermined strength, is secured at its one end to bar 94 and at its other end to stem 84 as at 106. This spring is of proper tension to maintain valve 82 in the open position when the pressure tending to hold said valve closed falls below a predetermined point.

Figure 1:
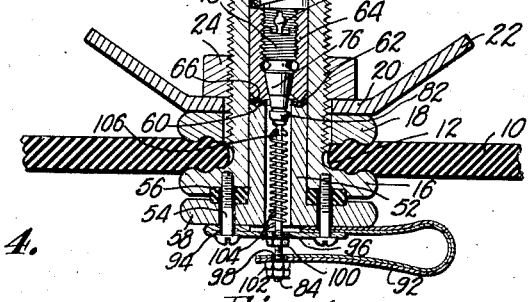
Figure 1 is an elevation, partly in section, of a tire alarm valve embodying this invention.

The operation of this signal valve under the various conditions will now be made. Referring first to Fig. 1, wherein the parts are shown in the normal operating position with valve 82 closed, it will be considered that the pressure within the inner tube and the opening 80 is sufficient to tension spring 104 and cause valve 82 to be seated, thereby preventing escape of air from the inner tube. Also, the air pressure within the inner tube is not sufficiently high to cause a movement of cage 64 against the action of compression spring 68 to move annular lip 66 away from its gasket 62.

Reference will now be had to Fig. 2, wherein the parts are in the position attained when too low air pressure is provided for the inner tube. It will be noted that valve 82 is in the open position. This is due to the fact that sufficient pressure is not present to maintain said valve in the closed position against the tension of the contraction spring 104. When valve 82 is so positioned, air from the inner tube will pass through the several passageways to compartment 40, thereby causing cap 38 to be moved longitudinally until aperture 42 is positioned above rubber gasket 34 and, when so positioned, air escaping through aperture 42 will produce an audible signal.

Figure 3:
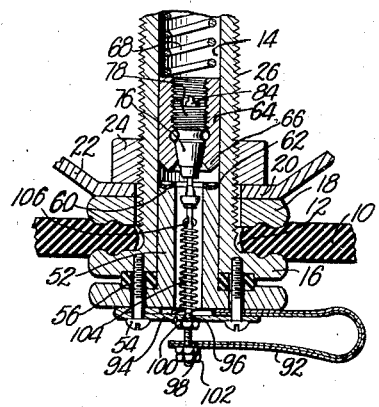
Fig. 3 is a view similar to that shown in Fig. 2, with the parts in position to signal in case of too high pressure.

In Fig. 3, it will be noted that cage 64 has been moved longitudinally against the action of spring 68 to move annular lip 66 from its gasket and also to move valve seat 74 away from valve 82, which is secured against longitudinal movement by means of nut 100, which contacts bar 94. When the parts are thus positioned with the valves open, it is very evident that the high pressure air within the inner casing will pass to chamber 40 to cause an audible signalling in the manner described above.

Figure 4:
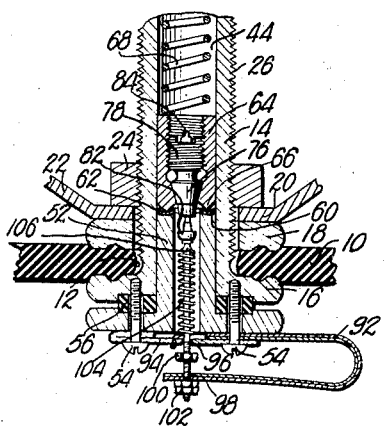
Fig. 4 is a view similar to Fig. 2, with parts in position to give alarm when too high temperature is attained in the tire tube.

Referring now to Fig. 4, which shows the parts assumed when too high a temperature is reached within the inner tube. When this condition arises, the bi-metallic thermostat 92 will tend to open up and engage nuts 102, thereby moving valve stem 84 to cause valve 82 to move away from seat 74 and permit air to pass through valve tube 14 to chamber 40, thereby causing an audible signalling, as described above.

It is apparent that I have produced a tire alarm valve which will operate to signal the operator when too high or too low pressure or too high temperature is attained within the inner tube in said tire.

What I claim is:

1. A tire valve comprising a valve stem having a passage therethrough, a tubular piston type cage slidably mounted in said passage, a valve seat formed by one end of said cage, a valve element coacting with said seat to control flow through said cage, means urging said cage toward said valve element but yieldable to permit movement thereof away from said valve element by excessive air pressure in said passage, means to limit movement of said cage toward said valve element, resilient means for urging said valve element away from said cage seat when air pressure in said passage falls below a predetermined value above atmospheric pressure, and means operable by excessive temperature conditions in said passage to open said valve element, adjustable means cooperating with said temperature responsive means to act as a stop to limit the movement of said valve element toward said cage.

2. A tire valve comprising a valve stem having a passage therethrough, a tubular piston type cage slidably mounted in said passage, a valve seat formed by one end of said cage, a valve element coacting with said seat to control flow through said cage, means urging said cage toward said valve element but yieldable to permit movement thereof away from said valve element by excessive air pressure in said passage, means to limit movement of said cage toward said valve element, resilient means for urging said valve element away from said cage seat when air pressure in said passage falls below a predetermined value above atmospheric pressure, and means operable by excessive temperature conditions in said passage to open said valve element, said temperature responsive means being mounted to normally permit independent movement of said valve member.

3. A tire valve comprising a valve stem having a passage therethrough, a tubular piston type cage slidably mounted in said passage, a valve seat formed by one end of said cage, a valve element coacting with said seat to control flow through said cage, means urging said cage toward said valve element but yieldable to permit movement thereof away from said valve element by excessive air pressure in said passage, means to limit movement of said cage toward said valve element, resilient means for urging said valve element away from said cage seat when air pressure in said passage falls below a predetermined value above atmospheric pressure, and means operable by excessive temperature conditions in said passage to open said valve element, said temperature responsive means acting as a stop to limit the movement of said valve element toward said cage.

WILLIAM H. WEST.